(12) United States Patent
Talley et al.

(10) Patent No.: US 8,559,339 B1
(45) Date of Patent: Oct. 15, 2013

(54) LOW-COST-INTERNET-BASE-STATION-(LCIB) USER-ADAPTATION ALGORITHM

(75) Inventors: Ryan S. Talley, Overland Park, KS (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 979 days.

(21) Appl. No.: 11/940,159

(22) Filed: Nov. 14, 2007

(51) Int. Cl.
*H04L 12/28* (2006.01)
*H04W 4/00* (2009.01)
*H04W 40/00* (2009.01)
*H04B 3/10* (2006.01)
*H04B 7/00* (2006.01)

(52) U.S. Cl.
USPC ........... 370/255; 370/338; 370/491; 370/500; 455/446; 455/522

(58) Field of Classification Search
USPC .......................... 370/358, 230, 228, 238, 318
See application file for complete search history.

(56) References Cited

U.S. PATENT DOCUMENTS

| | | | |
|---|---|---|---|
| 4,996,715 A | 2/1991 | Marui et al. |
| 5,634,191 A | 5/1997 | Beasley |
| 5,767,778 A | 6/1998 | Stone et al. |
| 5,832,365 A | 11/1998 | Chen et al. |
| 5,937,332 A | 8/1999 | Karabinis |
| 6,125,279 A | 9/2000 | Hyziak et al. |
| 6,141,531 A | 10/2000 | Williams et al. |
| 6,167,240 A | 12/2000 | Carlsson et al. |
| 6,219,540 B1 | 4/2001 | Besharat et al. |
| 6,292,471 B1 | 9/2001 | Cao et al. |
| 6,404,775 B1 | 6/2002 | Leslie et al. |
| 6,456,652 B1 | 9/2002 | Kim et al. |
| 6,493,537 B1 | 12/2002 | Ogawa |
| 6,718,180 B1 | 4/2004 | Lundh et al. |
| 7,035,587 B1 | 4/2006 | Yarkosky |
| 7,088,959 B2 | 8/2006 | Ho et al. |
| 7,280,501 B2 | 10/2007 | O'Neill et al. |
| 7,346,018 B2 | 3/2008 | Holtzman et al. |
| 7,626,966 B1 | 12/2009 | Ruiter et al. |
| 7,787,899 B1 | 8/2010 | Talley et al. |
| 7,813,323 B1 | 10/2010 | Talley et al. |
| 7,848,238 B1 | 12/2010 | Pawar et al. |
| 2002/0068534 A1 | 6/2002 | Ue et al. |
| 2003/0119460 A1 | 6/2003 | Zipper |
| 2003/0171132 A1 | 9/2003 | Ho et al. |

(Continued)

OTHER PUBLICATIONS

Unpublished U.S. Appl. No. 11/854,504, filed Sep. 12, 2007 entitled "Mitigating Interference by Low-Cost-Internet-Base-Station (LCIB) Pilot Beacons with Macro-Network Communications".

(Continued)

*Primary Examiner* — Xavier S. Wong
*Assistant Examiner* — Jeremy Costin

(57) ABSTRACT

Methods and systems are provided for implementing a low-cost-Internet-base-station-(LCIB) user-adaptation algorithm. In an embodiment, an LCIB receives usage attempts from a plurality of mobile stations. The LCIB stores records corresponding to the usage attempts, where each record identifies the corresponding mobile station from which the corresponding usage attempt was received. The LCIB uses the records to classify each mobile station in the plurality of mobile stations as authorized or rather as unauthorized. The LCIB then configures its coverage area so as to exclude the unauthorized mobile stations.

20 Claims, 4 Drawing Sheets

(56) References Cited

U.S. PATENT DOCUMENTS

| | | | |
|---|---|---|---|
| 2004/0110525 | A1 | 6/2004 | Black et al. |
| 2004/0204097 | A1 | 10/2004 | Scheinert et al. |
| 2005/0094616 | A1 | 5/2005 | Sakakura |
| 2005/0143118 | A1 | 6/2005 | Bernhardsson et al. |
| 2005/0148368 | A1 | 7/2005 | Scheinert et al. |
| 2006/0073791 | A1* | 4/2006 | Senarath et al. ........... 455/67.13 |
| 2006/0223444 | A1 | 10/2006 | Gross et al. |
| 2007/0042799 | A1 | 2/2007 | Jubin et al. |
| 2007/0054670 | A1 | 3/2007 | Kalika et al. |
| 2007/0097941 | A1* | 5/2007 | Le et al. ........................ 370/341 |
| 2007/0109999 | A1* | 5/2007 | Brunner ........................ 370/331 |
| 2007/0165593 | A1* | 7/2007 | Hundal et al. ................ 370/349 |
| 2008/0188265 | A1 | 8/2008 | Carter et al. |
| 2008/0244148 | A1* | 10/2008 | Nix et al. ...................... 710/313 |
| 2008/0305784 | A1* | 12/2008 | Dillinger et al. .............. 455/418 |
| 2008/0305801 | A1* | 12/2008 | Burgess et al. ............... 455/444 |
| 2008/0305835 | A1* | 12/2008 | Johnstone et al. ............ 455/561 |
| 2009/0005043 | A1 | 1/2009 | Claussen et al. |
| 2009/0069033 | A1* | 3/2009 | Karstens et al. ........... 455/456.3 |
| 2009/0104912 | A1 | 4/2009 | Foster et al. |
| 2009/0111499 | A1* | 4/2009 | Bosch et al. .................. 455/522 |
| 2009/0135754 | A1 | 5/2009 | Yavuz et al. |
| 2009/0279519 | A1 | 11/2009 | Brisebois et al. |
| 2010/0048212 | A1 | 2/2010 | Yavuz et al. |
| 2010/0178907 | A1 | 7/2010 | Oroskar et al. |

OTHER PUBLICATIONS

Unpublished U.S. Appl. No. 12/129,425, filed May 29, 2008 entitled "Low-Cost Internet-Base-Station (LCIB) Radio-Frequency (RF) Adaptation Using Stationary Transceivers".

Unpublished U.S. Appl. No. 11/854,511, filed Sep. 12, 2007 entitled "Call-Detection Algorithm for Mitigating Interference by Low-Cost Internet-Base-Station (LCIB) Pilot Beacons with Macro-Network Communications".

Unpublished U.S. Appl. No. 12/190,567, filed Aug. 12, 2008 entitled "Manually Configuring Low-Cost Internet-Base-Station (LCIB) Coverage Using an Associated Mobile Station".

Wan Choi, et al., "Automatic On-Off Switching Repeater for DS/CDMA Reverse Link Capacity Improvement," IEEE Communications Letters, vol. 5, No. 4, Apr. 2001, pp. 138-141.

Office Action from U.S. Appl. No. 10/097,415, dated Jun. 21, 2004.

Non-Final Office Action from U.S. Appl. No. 10/222,015, mailed Mar. 24, 2005.

Final Rejection from U.S. Appl. No. 10/222,015, mailed Jul. 29, 2005.

Unpublished U.S. Appl. No. 11/940,159, filed Nov. 14, 2007 entitled "Low-Cost-Internet-Base-Station-(LCIB) User-Adaptation Algorithm".

Unpublished U.S. Appl. No. 12/129,425, filed May 29, 2008 entitled "Low-Cost Internet-Base Station (LCIB) Radio-Frequency (RF) Adaptation Using Stationary Transceivers".

Notice of Allowance from U.S. Appl. No. 11/854,511 mailed Aug. 24, 2010.

Non-Final Office Action from U.S. Appl. No. 11/854,504 mailed Sep. 28, 2010.

Notice of Allowance from U.S. Appl. No. 11/854,504 mailed Mar. 2, 2011.

Notice of Allowance from U.S. Appl. No. 12/190,567 mailed Mar. 3, 2011.

Non-Final Office Action from U.S. Appl. No. 12/129,425, mailed Jul. 8, 2011.

* cited by examiner

LOW-COST-INTERNET-BASE-STATION-(LCIB) USER-ADAPTATION ALGORITHM

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

Figure 1:
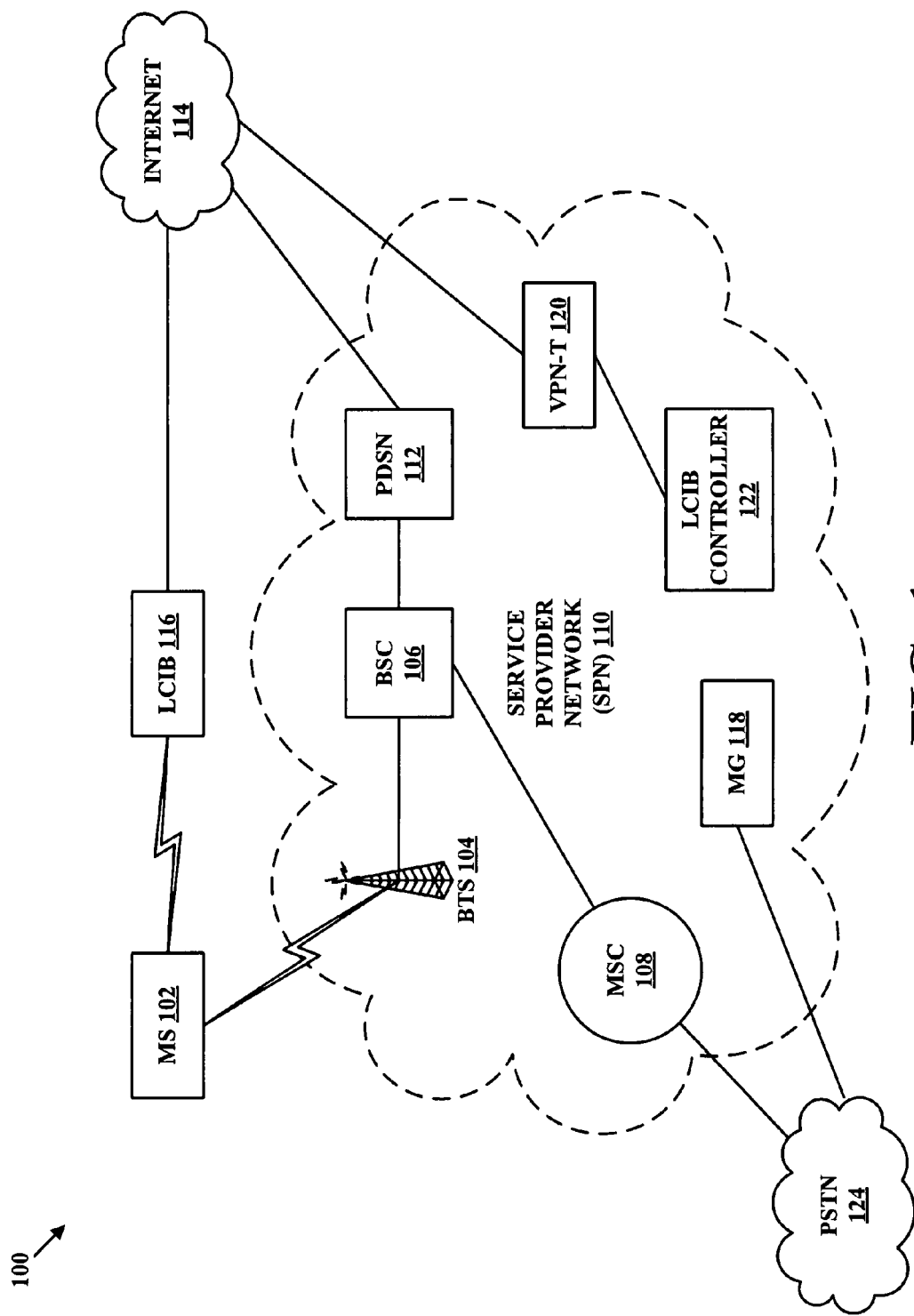
FIG. 1 is a simplified block diagram of a communication system, in accordance with exemplary embodiments.

LCIBs are typically able to operate in what are referred to herein as a restricted mode and a non-restricted mode. In restricted mode, use of (i.e. communication via, registration with) the LCIB is restricted to a list of authorized mobile stations. For example, the LCIB may maintain a list of five mobile identification numbers (MINs) that each correspond to a mobile station that is authorized to use the LCIB. Note that this number of mobile stations and manner of identifying them (i.e. by MIN) are examples only, and that the list could also or instead be maintained by one or more network entities in communication with the LCIB. The list could be provided by phone to a customer-service representative that could send the list via the Internet to the LCIB. Or the user could manage the list via a website. And other examples are possible. In non-restricted mode, any mobile stations in the coverage area of the LCIB can use it.

Upon power-up, restart, or some other command or triggering event, the LCIB may perform a ranging process, in order to select a transmission-power level for its pilot beacon, which advertises the LCIB's traffic-carrying carrier to nearby mobile stations. In a sense, then, this pilot-beacon transmission power defines the coverage area of the LCIB, which typically transmits its pilot beacon on one or more macro-network carriers on which the surrounding macro network provides service. If the surrounding macro network provides service on only one carrier, the LCIB will transmit its pilot beacon on that carrier (i.e. the LCIB will transmit a "fixed pilot beacon"). If the surrounding macro network provides service on more than one carrier, the LCIB will repeatedly cycle through transmitting its pilot beacon on some or all of those carriers (i.e. the LCIB will transmit a "frequency-hopping pilot beacon").

In accordance with the above-mentioned ranging process, in non-restricted mode, the LCIB may initially set its pilot-beacon transmission power to a low setting, and then gradually increase the power up to some upper bound, which may or may not be the LCIB's maximum possible transmission power. The LCIB may then set its pilot-beacon transmission power to the highest level (between the low setting and the upper bound, inclusive) at which at least one mobile station registered with the LCIB. That is, the LCIB may set its operating pilot-beacon transmission power to encompass all mobile stations that registered during the ranging process.

In restricted mode, the LCIB may conduct a somewhat similar ranging process, according to which the LCIB initially sets its pilot-beacon transmission power to a low setting, and then gradually increases the power until a mobile station that is not on the authorized list (i.e. an unauthorized mobile station) attempts to register with the LCIB, or until the LCIB reaches some upper-bound power level, whichever comes first. If no authorized mobile stations register with the LCIB during the ranging process, the LCIB may set its pilot-beacon transmission power to a low (e.g. zero) setting, and then periodically retry the ranging process (which it also may do in connection with any of the scenarios described herein).

If one or more authorized mobile stations register—and no unauthorized mobile stations attempt to register—with the LCIB during the ranging process, the LCIB may set its pilot-beacon transmission power to the highest level at which an authorized mobile station registered. If at least one authorized mobile station registers at a first power level—and then an unauthorized mobile station attempts to register at a second, higher power level, the LCIB may set its pilot-beacon transmission power level to the highest level at which an authorized mobile station registered prior to the first unauthorized mobile station trying to register. Note that this is exemplary, and that other algorithms could be used. Note that, in both non-restricted mode and restricted mode, in the case of a frequency-hopping pilot beacon, the LCIB may conduct its ranging process on each carrier on which its pilot beacon hops.

As presently contemplated, an LCIB in non-restricted mode will, instead of allowing access to any mobile station in its coverage area, classify and treat mobile stations as authorized or rather as unauthorized based the behavior of each respective mobile station that accesses or tries to access the LCIB. On a per-mobile-station basis, the LCIB will keep historical data that reflects, as examples, how many times (e.g. within a time period) the mobile station attempted to register with (and/or make a call via) the LCIB, how far the mobile station was from the LCIB when making each such attempt (based on reverse-link power level and/or forward-link signal quality), a time/date stamp of each such attempt, and/or other similar behavioral/usage factors.

Perhaps immediately, or perhaps after a grace period (e.g. the first day, week, or month of operation), the LCIB uses this history to classify the mobile stations listed therein as authorized or unauthorized. In an embodiment, authorized mobile stations are those that have attempted a high number of calls and/or registrations from a short distance in a frequent and/or recent manner; unauthorized mobile stations may be those that have attempted a low number of calls (a.k.a. connections) and/or registrations, those that have attempted most or all of their calls and/or registrations from a greater distance, and/or those that have attempted most or all of their calls and/or registrations infrequently and/or not recently. Note that other classification schemes could be used as well, based on the same or similar historical data.

Once this classification has been made, the LCIB may then configure its coverage area to cover only authorized mobile stations. That is, the LCIB may set its pilot-beacon transmission-power level such that mobile stations that the LCIB has classified as being unauthorized no longer attempt to register with the LCIB. In an embodiment, the LCIB conducts a ranging process similar to that described above with respect to restricted mode, such that the LCIB would set its pilot-beacon power level to cover any authorized mobile stations that could be reached with a power level that would not reach any unauthorized mobile stations.

Note that these historical-data-storage, classification, and power-level-setting steps could be repeated periodically, such that mobile stations that initially do not qualify can earn their way into authorized status, perhaps consistent with a general assumption that LCIBs are installed on private property, and that mobile stations that hang around long enough to achieve authorized status will usually be those that are permitted by the LCIB operator to do so.

And the LCIB may make additional use of the historical data, by prioritizing mobile stations within the authorized group. For example, the LCIB may rank mobile stations according to per-mobile-station profiles that are based on data such as amount of time registered with the LCIB, number of calls made via the LCIB, time/date stamp of calls (i.e. how frequent and/or recent), distance from the LCIB when making calls, etc. And note that "calls" could mean voice calls, data sessions, push-to-talk sessions, and/or any other types of communication sessions.

The LCIB may then use this ranking to decide which mobile stations get preferential treatment with respect to the LCIB's limited resources, such as channel elements. The LCIB may also use these profiles for calibrating settings such as traffic-channel power on a per-mobile-station basis. In some embodiments, in times where all of the LCIB's channel elements are in use, the LCIB may use this ranking to bounce some otherwise-authorized mobile stations to the macro network. And this classification scheme could be used in conjunction with still permitting the user to enter one or more preferred MINs into the LCIB, perhaps via customer service and/or a web or local HTML interface. Any manually-entered MINs could be given priority over MINs that are classified as authorized based on usage. And many other examples are possible.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
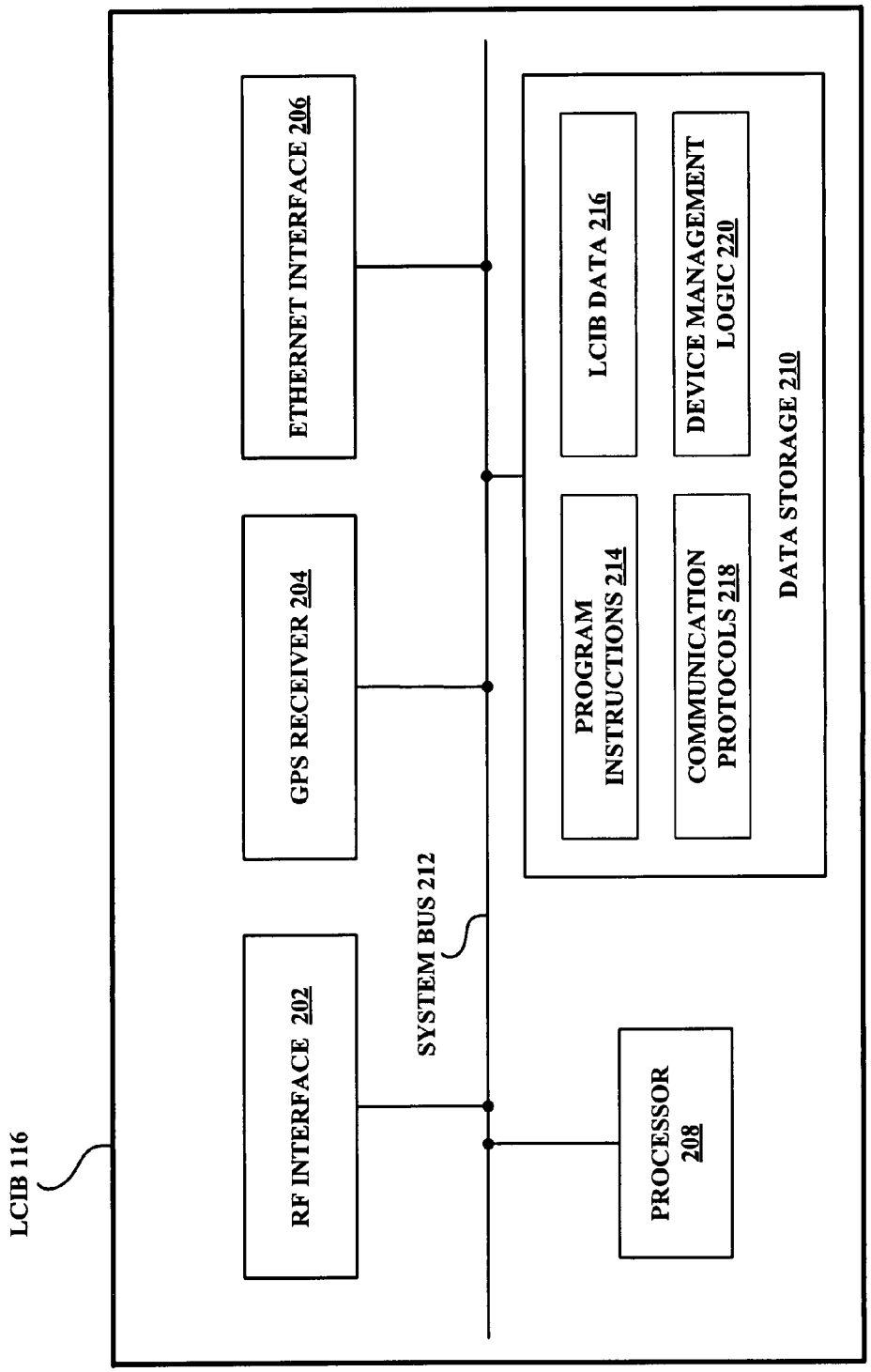
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
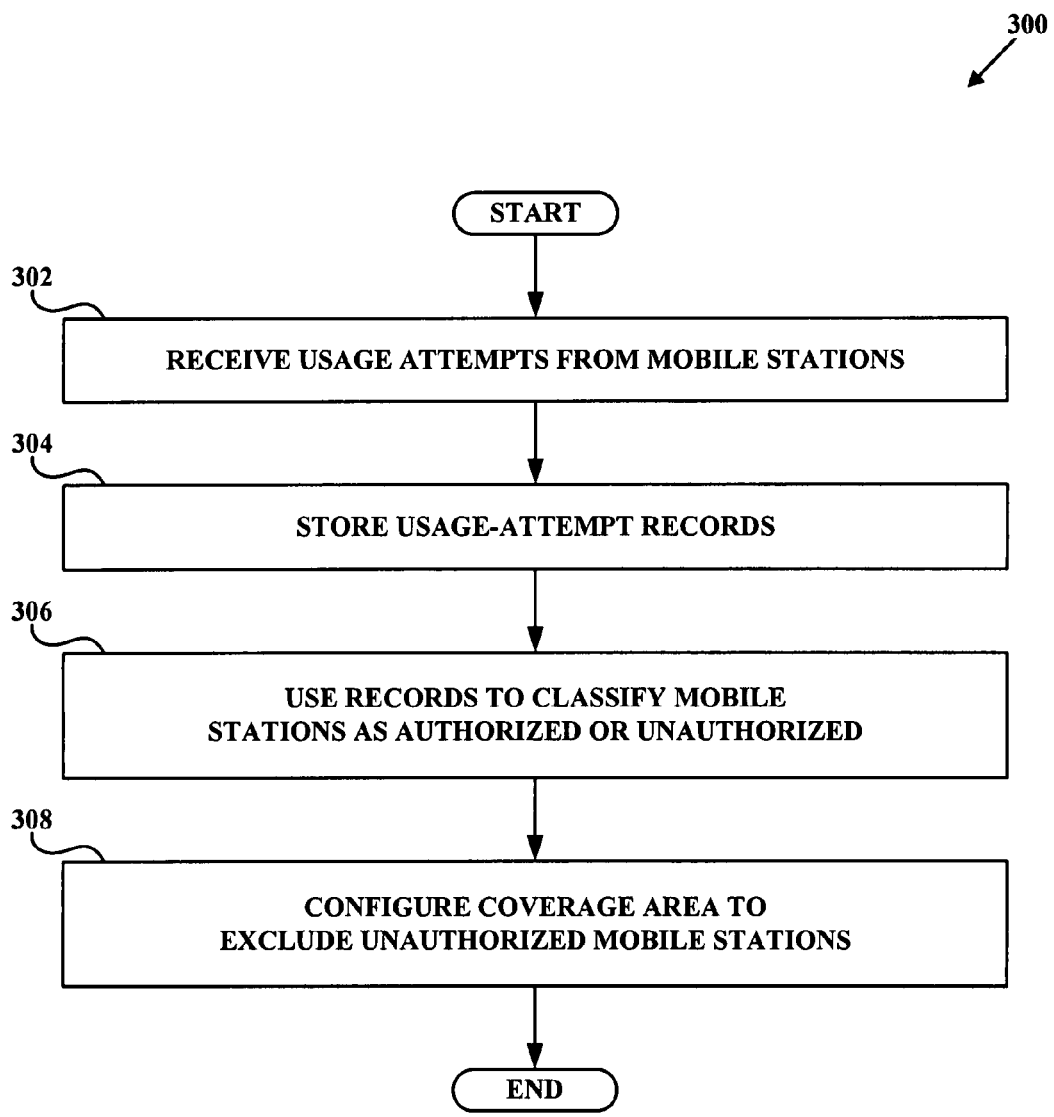
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 of adaptation to mobile-station usage attempts, carried out by LCIB 116. As shown in FIG. 3, method 300 begins at step 302, when LCIB 116 receives usage attempts from a plurality of mobile stations. At step 304, LCIB 116 stores records corresponding to the usage attempts, where each record identifies the corresponding mobile station from which the corresponding usage attempt was received. At step 306, LCIB 116 uses the records to classify each mobile station in the plurality of mobile stations as authorized or rather as unauthorized. At step 308, LCIB 116 configures its coverage area so as to exclude the unauthorized mobile stations.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, or any other network element(s).

i. Receive Usage Attempts from Mobile Stations

At step 302, LCIB 116 receives usage attempts from a plurality of mobile stations. As explained herein, LCIB 116 may communicate with each such mobile station over a CDMA air interface, or over an air interface that operates according to any other wireless technology. Each usage attempt received in step 302 may be a registration attempt and/or a connection attempt, where a connection attempt would be an attempt (i.e. request) to engage in a communication session, such as a voice call or data session.

ii. Store Usage-Attempt Records

At step 304, LCIB 116 stores records corresponding to the usage attempts that were received at step 302. Each such record may identify the corresponding mobile station from which the corresponding usage attempt was received. When saving each record, LCIB 116 may include various types of information therein. One such piece or set of information that LCIB 116 may include in each usage-attempt record is a timestamp that identifies time of day, day of the week, and/or date at which or on which the corresponding usage attempt was received.

Moreover, LCIB 116 may, responsive to receiving each usage attempt, calculate a distance to the mobile station from which the usage attempt was received, and store that distance in the record corresponding to the usage attempt. In some embodiments, this distance may be expressed in units such as feet, meters, etc. In other embodiments, the distance could be expressed in some other form, which may be a proxy for distance, such as reports from the mobile station of how well the LCIB's signal is being received by the mobile station, measurements of how well the mobile station's transmissions are being received by the LCIB, and/or any other expression of distance. GPS locations could be used as well.

iii. Use Records to Classify Mobile Stations as Authorized or Rather as Unauthorized At step 306, LCIB 116 uses the usage-attempt records—stored in step 304—to classify each mobile station in the plurality of mobile stations as authorized or rather as unauthorized. LCIB 116 may do so according to many different algorithms, preferences, sets of data, etc. In one embodiment, LCIB 116 classifies mobile stations having a large number of associated usage-attempt records as authorized, and classifies all other mobile stations as unauthorized. And note that, in this embodiment as in any of the others, the usage-attempt records that LCIB 116 uses for classification of mobile stations could have been gathered over any suitable time period.

As stated above, each usage-attempt record may include a corresponding timestamp that identifies at least one of (i) a time of day at which the corresponding usage attempt was received, (ii) a day of the week on which the corresponding usage attempt was received, and (iii) a date on which the corresponding usage attempt was received. As such, in an embodiment, LCIB 116 may classify a given mobile station as authorized or rather as unauthorized based at least in part on the frequency and/or recentness of the timestamps of the usage-attempt records corresponding to the usage attempts from the given mobile station. For example, mobile stations having many recent usage attempts may be classified as authorized.

As stated above, each usage-attempt record may include a measurement of (or perhaps a proxy for) the distance between the corresponding mobile station and LCIB 116 when the mobile station made the given usage attempt. As such, in an embodiment, classifying a given mobile station as authorized or unauthorized may involve classifying the mobile station based at least in part on the distances stored in the records corresponding to the usage attempts from the mobile station. Again, these distances could be expressed in or calculated from such values as forward-link-signal-quality reports from the mobile station, reverse-link transmission power of the mobile station, GPS locations, and/or any other suitable values. In an embodiment, proximity to LCIB 116 when making usage attempts may help a mobile station to be classified as authorized. This could pertain to an average distance, a sufficient number or percentage of usage attempts being from within a certain distance, or according to some other distance-related criteria.

A combination of these approaches could be used as well. That is, classifying a mobile station as authorized or unauthorized may involve consideration of frequency and recentness of usage-record timestamps, the sheer number of usage-attempt records associated with the mobile station, distance measurements in those usage-attempt records, and perhaps other metrics as well. In an embodiment, authorized mobile stations may be those that have at least a first number of associated usage-attempt records, an average distance among those records that is less than some threshold distance, and at least a second number of records that have a timestamp within a certain time period, such as the last day or week, as examples. And the first and second numbers could be the same or different, depending on the preferences of the implementation.

In another embodiment, mobile stations may be classified as authorized if they have a sufficient number of associated usage-attempt records that were made from less than a threshold distance and that have a timestamp within a given time period. That is, average distance need not be used: it could just be the case that a sufficient number of sufficiently-close-by and sufficiently-recent usage attempts would qualify a mobile station as authorized. And under any definition of authorized, all mobile stations not meeting that definition could be categorized as unauthorized. As a side note, there is no requirement that this analysis be performed with respect to every usage attempt that LCIB 116 has ever received. That is, only those received in a certain time period could be assessed, among other possible categorizations.

iv. Configure Coverage Area to Exclude Unauthorized Mobile Stations

At step 308, LCIB 116 configures its coverage area so as to exclude the unauthorized mobile stations. Once the usage attempts have been received (step 302), the usage-attempt records (a.k.a. the usage-attempt history) have been stored (step 304), and the classification as authorized and unauthorized has been made based on those records (step 306), LCIB 116 then configures its coverage area to cover only authorized users, i.e. to exclude the unauthorized users. In an embodiment, LCIB 116 carries out step 308 by configuring its pilot-beacon transmission-power level to a setting that is less than the lowest level at which usage attempts from (now-classified-as-)unauthorized mobile stations have been received.

Thus, LCIB 116 may store data that reflects the pilot-beacon transmission-power level at which each mobile station being considered most recently registered. The LCIB may then select an operating level for its pilot-beacon transmission power that would include only authorized mobile stations, thus excluding all unauthorized mobile stations (which could result in some authorized mobiles being excluded). Rather than using potentially-outdated values, LCIB 116 may, after the classification has been completed, run a ranging process such as that described above with respect to restricted mode, and then set its pilot-beacon transmission-power level accordingly, such that unauthorized mobile stations would not be in the coverage area of LCIB 116, and would thus not attempt to register therewith.

v. Additional Considerations

In general, LCIB 116 may be programmed to carry out method 300 periodically, so as to adjust the lists of authorized and unauthorized mobile stations over time. This would make it possible, for example, for a mobile station that initially is categorized as unauthorized to, as an example, make enough usage attempts in a short enough amount of time, and from a short enough distance, to work its way into authorized status and remain in the coverage area of LCIB 116. Furthermore, LCIB 116 may be programmed to, upon power-up, restart, etc., wait a grace period (e.g. a day, a week, etc.) prior to classifying mobile stations and configuring its coverage area. This would give mobile stations that clearly would be authorized a chance to build up sufficient usage-attempt records to be accorded their rightful status.

On that note, the user of LCIB 116 could still be permitted to enter—perhaps via customer service and/or an HTML interface—a list of one or more mobile stations that are granted automatic authorized and/or prioritized status. This could operate in conjunction with the usage-attempt approach described herein. Furthermore, the usage-attempt records could be used to prioritize the authorized mobile stations for access to any limited resources of LCIB 116, such as channel elements. That is, authorized mobile stations could be prioritized based on such metrics as time spent registered, number of calls made, timestamps of calls made, distance from the LCIB when making calls, and/or any others.

Higher-priority mobile stations could then be given access to channel elements to make calls at times when the number of mobile stations registered with LCIB 116 exceeds the number of channel elements provided by LCIB 116. Lower-priority mobile stations could be redirected to the macro network, as an example. Certain mobile stations could be given priority on certain days of the week and/or at certain times of day. And other examples are possible. Any number of home mobile stations (i.e. those provided by the user to LCIB 116 via customer service and/or an HTML interface, as examples), could be prioritized in any manner, such as ahead of even the mobile stations that had been classified as authorized based on usage-attempt records.

b. A Second Exemplary Method

Figure 4:
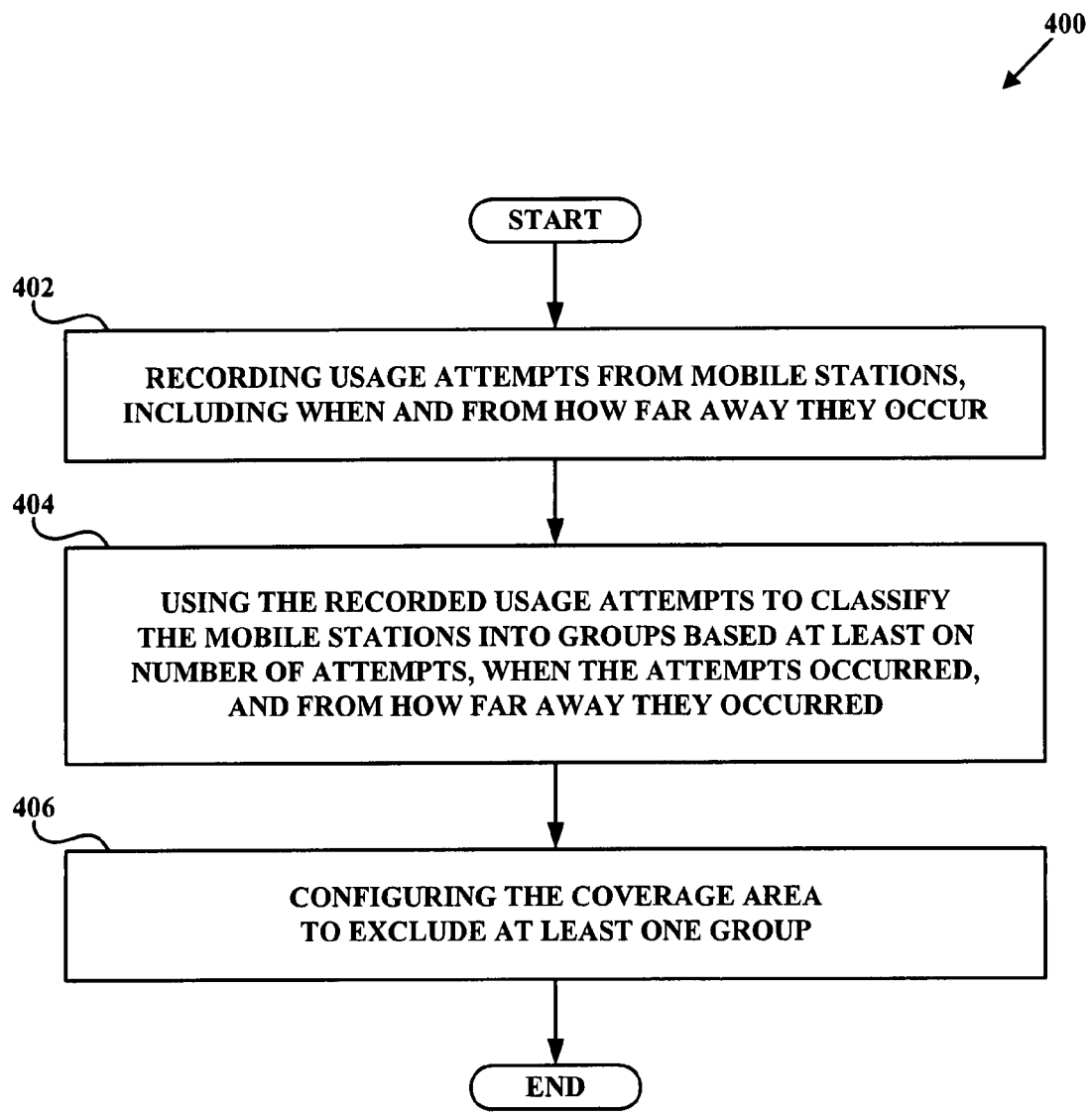
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB, such as LCIB 116, or perhaps by an LCIB in cooperation with one or more other entities, such as VPN terminator 120 and/or LCIB controller 122. Method 400 is similar in some respects to method 300, and thus is not described in as great of detail.

As shown in FIG. 4, method 400 begins at step 402, when LCIB 116 records usage attempts received from mobile stations. Each such usage attempt could be a registration attempt and/or a connection attempt. Furthermore, recording a given usage attempt from a given mobile station may involve recording when the attempt occurs and the distance between the mobile station and LCIB 116 when the attempt occurs. At step 404, LCIB 116 uses the recorded usage attempts to classify the mobile stations from which the usage attempts were received into at least two groups based at least on, on a per-mobile-station basis, how many attempts were recorded, when the attempts were recorded, and the distances between the mobile station and LCIB 116 when the attempts were recorded. At step 406, LCIB 116 configures its coverage area so as to exclude at least one of the groups.

4. Conclusion

Various exemplary embodiments have been described above. Those skilled in the art will understand, however, that changes and modifications may be made to those examples without departing from the scope of the claims.

The invention claimed is:

1. A method of adaptation to mobile-station usage attempts, carried out by a low-cost Internet base station (LCIB) having a coverage area, the method comprising:
   an LCIB transmitting a pilot beacon having a pilot-beacon transmission-power level that defines the coverage area of the LCIB;
   the LCIB receiving usage attempts from a plurality of mobile stations;
   the LCIB storing records corresponding to the usage attempts, each record identifying the corresponding mobile station from which the corresponding usage attempt was received, each record having a corresponding timestamp that identifies at least one of (i) a time of day at which the corresponding usage attempt was received, (ii) a day of the week on which the corresponding usage attempt was received, and (iii) a date on which the corresponding usage attempt was received;
   the LCIB storing data that reflects the respective pilot-beacon transmission-power level at which each respective usage attempt was received;
   the LCIB using the records to classify each mobile station in the plurality of mobile stations as authorized or rather as unauthorized, wherein classifying a given mobile station as authorized or rather as unauthorized comprises classifying the given mobile station based at least in part on at least one of the frequency and the recentness of the timestamps of the records corresponding to the usage attempts from the given mobile station; and the LCIB configuring the coverage area by setting the pilot-beacon transmission-power level to be less than the lowest level at which the stored data indicates that a usage attempt from an unauthorized mobile station had been received.

2. The method of claim 1, wherein the LCIB communicates with each mobile station in the plurality of mobile stations over a code division multiple access (CDMA) air interface.

3. The method of claim 1, wherein each usage attempt comprises at least one of a registration attempt and a connection attempt.

4. The method of claim 1, wherein classifying a given mobile station as authorized or rather as unauthorized further comprises classifying the given mobile station based at least in part on the number of records corresponding to the usage attempts from the given mobile station.

5. The method of claim 1, further comprising:
responsive to receiving each usage attempt, calculating a distance to the mobile station from which the usage attempt was received, and storing the distance in the record corresponding to the usage attempt,
wherein classifying a given mobile station as authorized or rather as unauthorized further comprises classifying the given mobile station based at least in part on the distances stored in the records corresponding to the usage attempts from the given mobile station.

6. The method of claim 5, wherein calculating a distance to a given mobile station comprises calculating the distance based on at least one of forward-link-signal-quality reports from the given mobile station, reverse-link transmission power of the given mobile station, and Global Positioning System (GPS) locations of the LCIB and the given mobile station.

7. The method of claim 5, further comprising classifying as authorized mobile stations that have (i) at least a first number of corresponding records, (ii) an average distance among their corresponding records that is less than a threshold distance, and (iii) at least a second number of corresponding records having a timestamp within a time period.

8. The method of claim 7, further comprising classifying as unauthorized all other mobile stations.

9. The method of claim 5, further comprising classifying as authorized mobile stations that have at least a first number of corresponding records that have (i) a distance that is less than a first distance and (b) a timestamp within a time period.

10. The method of claim 9, further comprising classifying as unauthorized all other mobile stations.

11. The method of claim 1, carried out periodically.

12. The method of claim 1, further comprising waiting a grace period prior to classifying the mobile stations and configuring the coverage area.

13. The method of claim 1, further comprising using the records to prioritize the authorized mobile stations for access to a set of channel elements.

14. The method of claim 13, wherein prioritizing the authorized mobile stations for access to the set of channel elements comprises prioritizing the authorized mobile stations based on at least one of time spent registered with the LCIB, number of calls made, timestamps of calls made, and distance from the LCIB when making calls.

15. The method of claim 13, further comprising prioritizing one or more home mobile stations over one or more authorized mobile stations for access to the set of channel elements.

16. A low-cost Internet base station (LCIB) having a coverage area, the LCIB comprising:
a communication interface;
a processor; and
data storage comprising instructions executable by the processor for:
transmitting a pilot beacon having a pilot-beacon transmission-power level that defines the coverage area of the LCIB;
receiving usage attempts from a plurality of mobile stations;
storing records corresponding to the usage attempts, each record identifying the corresponding mobile station from which the corresponding usage attempt was received, each record having a corresponding timestamp that identifies at least one of (i) a time of day at which the corresponding usage attempt was received, (ii) a day of the week on which the corresponding usage attempt was received, and (iii) a date on which the corresponding usage attempt was received;
storing data that reflects the respective pilot-beacon transmission-power level at which each respective usage attempt was received;
using the records to classify each mobile station in the plurality of mobile stations as authorized or rather as unauthorized, wherein classifying a given mobile station as authorized or rather as unauthorized comprises classifying the given mobile station based at least in part on at least one of the frequency and the recentness of the timestamps of the records corresponding to the usage attempts from the given mobile station; and
configuring the coverage area by setting the pilot-beacon transmission-power level to be less than the lowest level at which the stored data indicates that a usage attempt from an unauthorized mobile station had been received.

17. The LCIB of claim 16, wherein the LCIB communicates with each mobile station in the plurality of mobile stations over a code division multiple access (CDMA) air interface.

18. The LCIB of claim 16, wherein each usage attempt comprises at least one of a registration attempt and a connection attempt.

19. The LCIB of claim 16, wherein classifying a given mobile station as authorized or rather as unauthorized further comprises classifying the given mobile station based at least in part on the number of records corresponding to the usage attempts from the given mobile station.

20. The LCIB of claim 16, the data storage further comprising instructions executable by the processor for waiting a grace period prior to classifying the mobile stations and configuring the coverage area.

* * * * *